United States Patent

Kokubu et al.

[11] 4,315,117
[45] Feb. 9, 1982

[54] ELECTRICAL SWITCH DEVICE

[75] Inventors: Sadao Kokubu, Iwakura; Nobuhiro Endou, Aichi, both of Japan

[73] Assignee: Kabushiki Kaisha Tokai Rika Denki Seisakusho, Aichi, Japan

[21] Appl. No.: 122,811

[22] Filed: Feb. 19, 1980

[30] Foreign Application Priority Data

Mar. 10, 1979 [JP] Japan .............................. 54-30919[U]

[51] Int. Cl.³ .......................... B60Q 1/00; H01H 9/00
[52] U.S. Cl. .............................. 200/61.27; 200/61.34; 200/61.54; 200/5 R
[58] Field of Search ............ 200/5, 6 A, 61.27, 61.34, 200/61.35, 61.54, 16 C, 16 D

[56] References Cited

U.S. PATENT DOCUMENTS 2,453,035 11/1948 Ponsy ..................................... 200/4
4,006,328 2/1977 Kimberlin et al. ............... 200/61.54
4,179,592 12/1979 Nitsch ............................. 200/61.54

FOREIGN PATENT DOCUMENTS 2628744 1/1977 Fed. Rep. of Germany ... 200/61.54
2227741 11/1974 France ............................. 200/61.54

Primary Examiner—William M. Shoop
Assistant Examiner—Donald L. Rebsch
Attorney, Agent, or Firm—Wenderoth, Lind & Ponack

[57] ABSTRACT

An electrical switch device applicable, for example, to a lever switch arrangement for use in motor vehicles which is arranged to smoothly change over its functioning state through at least three steps of stepwise movement in each direction in its reciprocating operation.

10 Claims, 24 Drawing Figures

Fig. 5

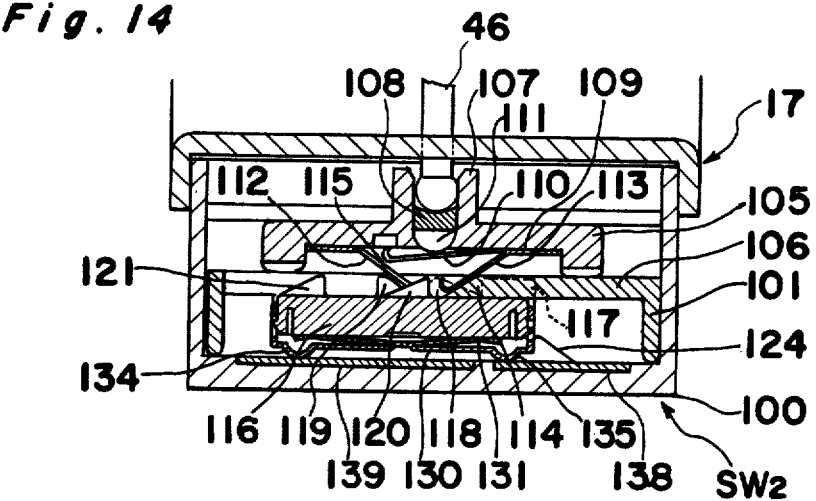
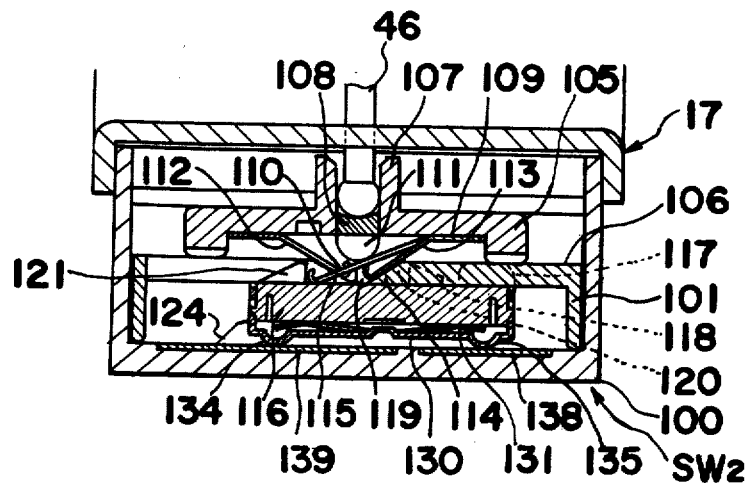
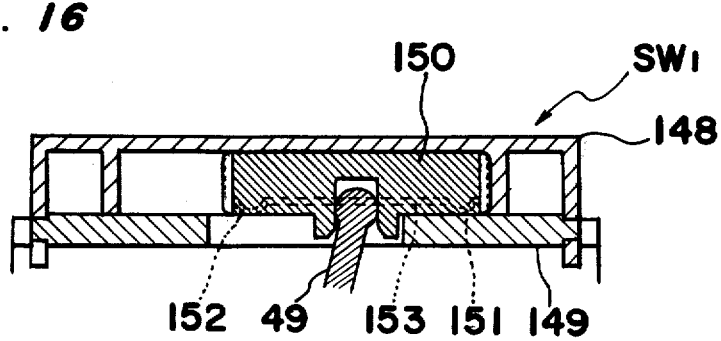

4,315,117

ELECTRICAL SWITCH DEVICE

BACKGROUND OF THE INVENTION

The present invention generally relates to an electrical switch and more particularly to an electrical switch device which is capable of smoothly changing over its switching state through at least three steps of movement in each direction in a reciprocating operation, and which may be advantageously applied, for example, to a lever switch arrangement for use in a motor vehicle and the like.

Conventionally, in the switch devices of the above described type having a complicated structure including, for example, contact holders and holder members arranged to reciprocate on the contact holders, etc., there are such inconveniences that the contact holder to be advanced or returned during the stepwise operation and to be retained at the advanced or returned positions is undesirably moved or returned, or returning of the holder member is obstructed for some reason, so that the smooth functioning of the switch device itself is hindered to a large extent.

On the other hand, in the conventional switch arrangements, for example, a lever switch arrangement having the switch device of the above described type incorporated therein, there are also many disadvantages related to the operation thereof as described hereinbelow.

Generally, in motor vehicles, it has been a common practice to provide means so that signals or indications for right or left-turn of the motor vehicle are normally given, for example, by upwardly or downwardly operating a control lever provided in the vicinity of a steering wheel located forward of a driver's seat, and that in order to stepwisely change-over the lighting system from a completely turned-off state to a state where small parking indicating lamps or the like are lit, and further to a state where head lamps are illuminated, a suitable control member is provided in a position different from that of the control lever, such as another knob-like control member installed at a distal end of the control lever or the like.

The known arrangements as described above, however, have such drawbacks that, in the former in which the control member provided at the position different from the control lever operated for stepwise change-over, there are possibilities of dangers, since the driver has to even change his posture for stretching out his hand for the control knob located far away from the steering wheel, while in the latter in which the knob-like control member provided at the end of the control lever is to be manipulated, the driver must take his hand off the steering wheel, thus bringing about a hazardous state during operation of the vehicle.

For overcoming the disadvantages as described above, the present inventors have directed their attention to a conventional lever switch in which the control lever is adapted to be movable, besides in an upward or downward direction or a first direction mentioned earlier, to for example, a forward or backward direction or a second direction for changing over the headlights from the high beam state to the low beam state or vice versa, so as to provide an arrangement for controlling the lighting system by the operation of the control lever in such second direction. However, in the lever switch as described above, if the control lever is arranged to be held in each of the rotated positions after operation thereof in the second direction, it also becomes difficult for the driver holding the steering wheel to reach out his hand for the lever to effect the basic control, i.e. to give the right or left-turn signal in this case. Particularly, the problem becomes more critical in lighting control and the like in the which, as compared with the dimmer control involving change-over only in two steps, change-over in three or more steps is normally required, thus making it necessary for the driver to take his hand off the steering wheel for the control which is undesirable.

SUMMARY OF THE INVENTION

Accordingly, an essential object of the present invention is to provide an improved switch device which is capable of effecting particularly smooth change-over of its condition through at least three steps of movement both for advancing and returning during reciprocating operation.

Another important object of the present invention is to provide an improved lever switch arrangement for use in a motor vehicle and the like in which the switch device of the described type is incorporated, and operation of a control lever in a first direction can be effected from a predetermined neutral position with respect to a second direction so that even in a second or third step of the operation of the control lever in the second direction, the operation thereof in the first direction is not obstructed, thereby avoiding the necessity for the driver to take his hand off the steering wheel, etc. so as to make possible safe driving of the motor vehicle.

A further object of the present invention is to provide an improved lever switch arrangement of the above described type which has a simple construction and which functions accurately and with high reliability, and can be readily incorporated into motor vehicles of various types at low cost.

In accomplishing these and other objects, according to one preferred embodiment of the present invention, there is provided an electrical switch which includes a base plate member having a plate surface on which stationary contact plates are disposed, a contact holder movable on the plate surface in at least three steps in each direction of reciprocation thereof and having corresponding movable contact plates provided thereon for selectively connecting required ones of the stationary contact plates at a stopping position thereof in each of the three steps of movement and also having engaging projections arranged in respective moving directions thereof facing in the respective moving directions with respect to the each direction of the reciprocation, a holder member provided to reciprocate on the contact holder in the same directions as the contact holder and an having engaging member for each direction of the reciprocation provided to engage and push, through the reciprocation thereof, a corresponding one of said engaging projections located in the each direction of the reciprocation for shifting the contact holder to a position for a subsequent step, a projecting wall for each direction of reciprocation provided at a side of the holder member where the engaging member is located and in a position adjacent the engaging projections so as to remain stationary during movement of the holder member for causing a particular engaging member of the engaging members for each direction of reciprocation which is directed in the direction opposite to the direction of movement, to elastically ride to a position to go over the engaging projection and biasing means for imparting to the holder member an automatic returning force to the original position after the movement of the holder member.

By the arrangement as described above, a switch device suitable for incorporation, for example, into a lever switch arrangement for use in a motor vehicle and the like, and capable of smoothly changing over its state through at least three steps of movement both for advancing and returning in its reciprocating operation has been advantageously provided, with substantial elimination of the disadvantages inherent in the conventional switch devices and lever switch arrangements of such kinds.

BRIEF DESCRIPTION OF THE DRAWINGS

These and other objects and features of the present invention will become apparent from the following description taken in conjunction with the preferred embodiments thereof with reference to the accompanying drawings, in which;

FIG. 5 is a view similar to FIG. 4 which particularly shows the construction thereof in section, FIG. 14 is a sectional view of the second switch portion for explaining the function thereof, FIG. 15 is a view similar to FIG. 14, which particularly shows the second switch portion in a different state of function, FIG. 16 is a side sectional view similar to FIG. 6 which particularly shows a modification thereof.

Before the description of the present invention proceeds, it is to be noted that like parts are designated by like reference numerals throughout several views of the accompanying drawings.

DETAILED DESCRIPTION OF THE INVENTION

Hereinbelow, the electrical switch device of the present invention will be described in detail in the form thereof as applied to a lever switch arrangement for use in a motor vehicle and the like.

Figure 1:
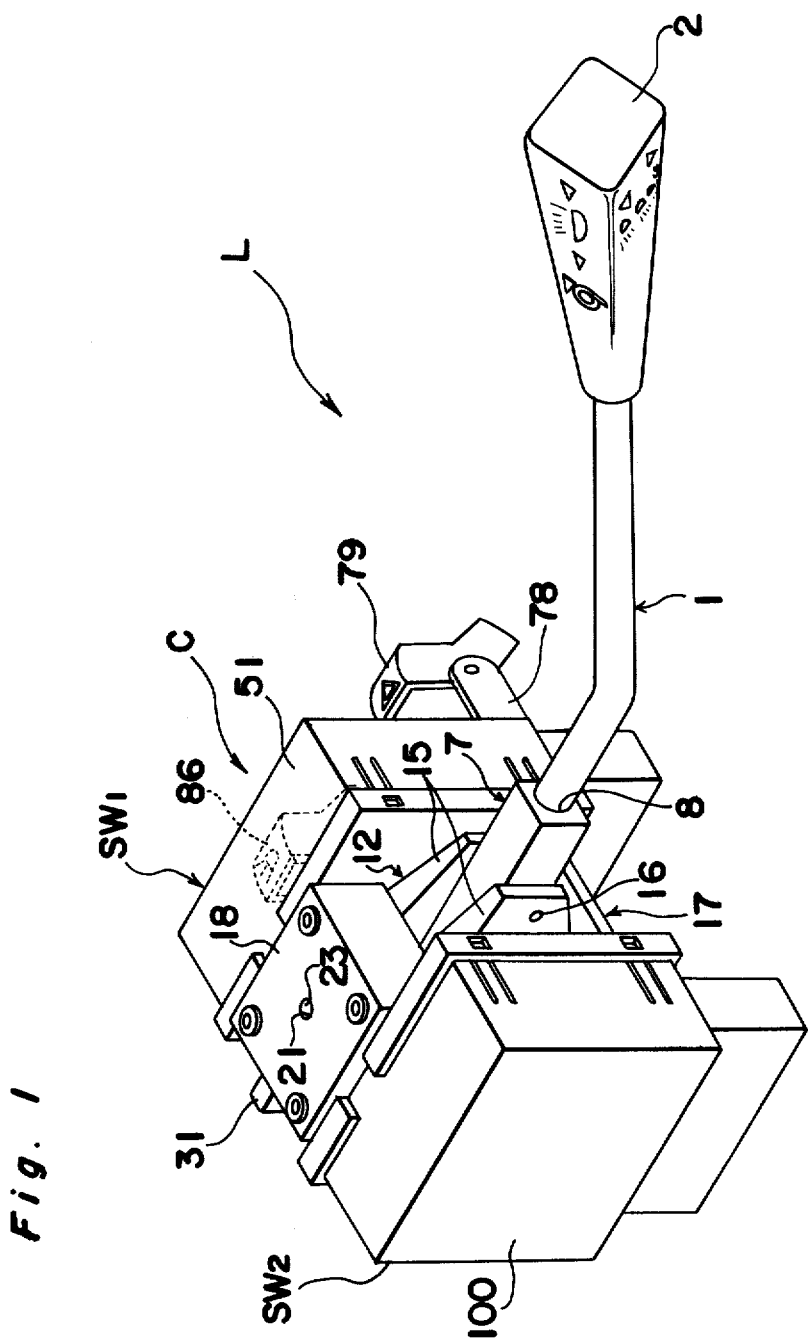
FIG. 1 is a perspective view of a lever switch arrangement according to one preferred embodiment of the present invention.

Referring now to the drawings, particularly to FIG. 1 through FIG. 15, there is shown an improved lever switch arrangement L according to one preferred embodiment of the present invention. In FIG. 1, the lever switch arrangement L generally includes a switch case C including therein switching elements described later, and a control lever 1 associated with the switching elements in a manner as described in detail hereinbelow.

Figure 2:
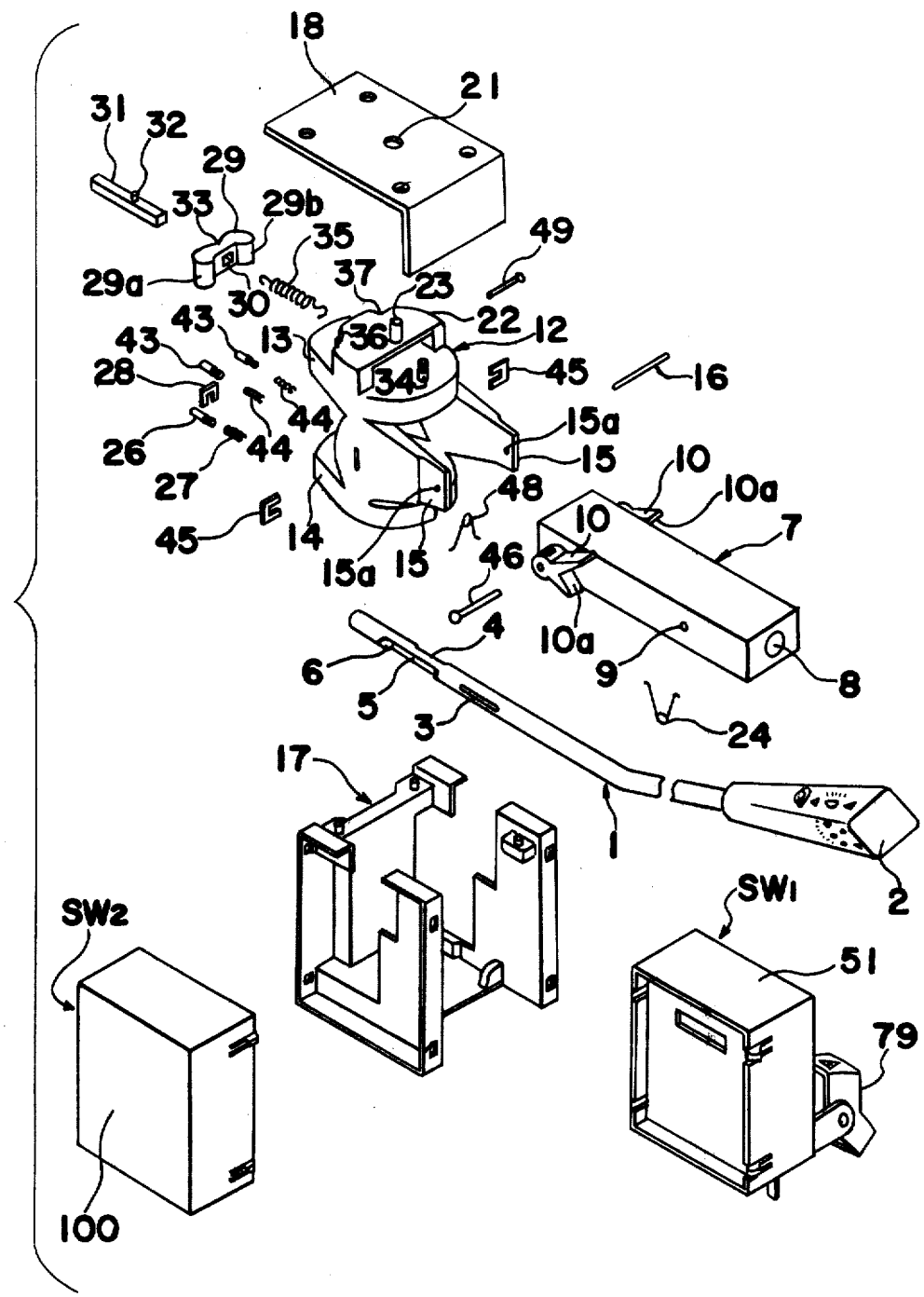
FIG. 2 is an exploded perspective view showing the structure of each part employed in the arrangement of FIG. 1.
Figure 3:
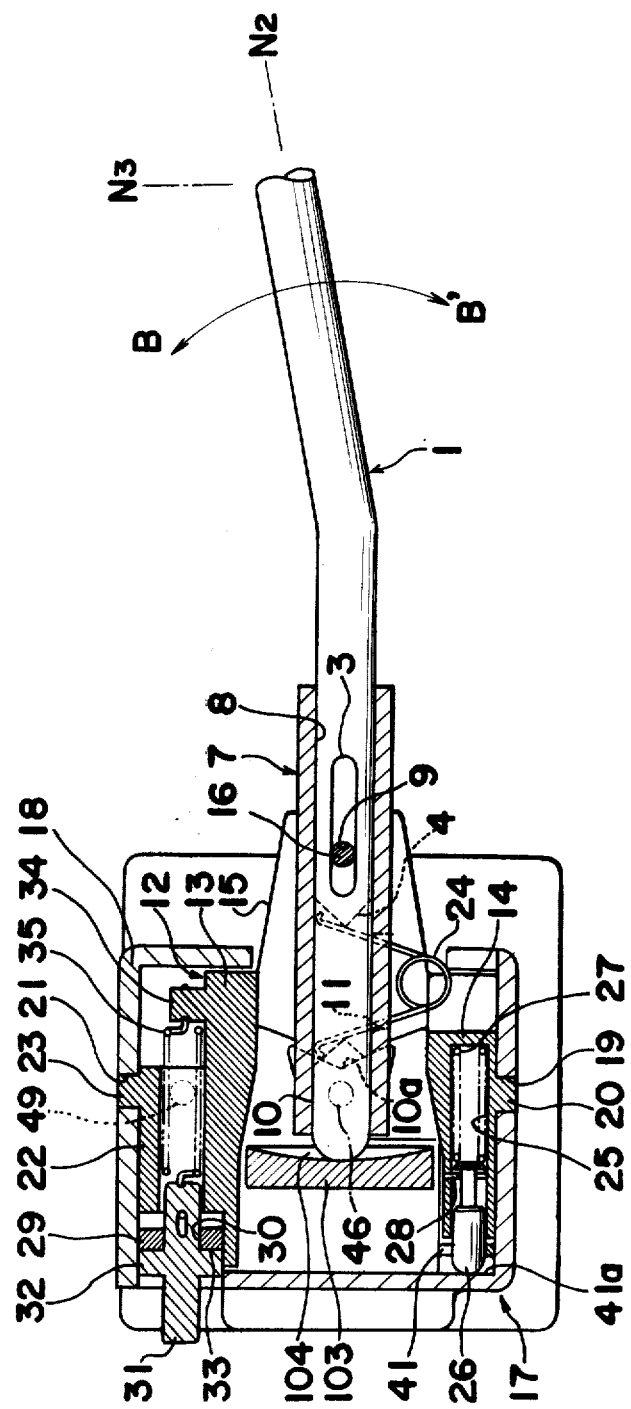
FIG. 3 is a side sectional view of the arrangement of FIG. 1.

The control lever 1 having a knob 2 at its one end is provided with an elongated opening or throughbore 3 formed in the intermediate portion thereof adjacent to its other end or base end, and a notch or recess 4 formed on one side and another notch or recess 5 formed at the other side of the base end as is most clearly seen in FIG. 2, with an inclined surface 6 being formed at one end of the notch 5 toward the distal portion of said base end of the lever 1. On the other hand, the switch case C includes a lever holder 7 of rectangular box-like configuration having a bore 8 which longitudinally extends therethrough, and slidably receives therein the base end and its adjacent portion of the lever 1. The lever holder 7 is also provided with another small bore 9 formed at a central portion of its side wall so as to intersect at right angles with the bore 8, a pair of projections or protrusions 10 of V-shaped cross section formed on opposite side walls at one end of the holder 7, and a further bore 11 formed in the under surface of the holder 7 in a position between the projections 10 and the bore 9 for communication with said longitudinal bore 8 as shown in FIG. 3. The switch case C further includes a bracket member 12 generally constituted by upper and lower base portions 13 and 14 which are connected to each other by a pair of spaced arm members 15, between which the lever holder 7 is inserted so as to be pivotally connected thereto by a pin 16 extended through openings 15a of the arm members 15, the bore 9 of the lever holder 7 and the elongated bore 3 of the control lever 1 and suitably retained at one side of the arm members 15. Further included in the switch case C are a body frame 17 in which the bracket member 12 mentioned above is accommodated, and a cover plate 18 for the body frame 17. In an opening 19 (FIG. 3) formed in approximately a central portion of the lower wall of the body frame 17, a projection 20 provided on the under surface of the lower base portion 14 of the bracket member 12 is rotatably received, while another projection 23 provided on the upper surface of a hollow raised portion 22 formed on the upper base portion 13 of the bracket member 12 is rotatably fitted into a corresponding opening 21 formed in approximately the central portion of the cover plate 18 as shown in FIG. 3. A torsion spring 24 is inserted through the opening 11 (FIG. 3) of the lever holder 7 into the notch 4 of the control lever 1 so that opposite ends of the spring 24 engage the corresponding edges of the notch 4 and opening 11. The lower base portion 14 of the bracket member 12 is further provided with a longitudinal cavity or bore 25, in which a movable piece or plunger 26 is accommodated together with a biasing compression spring 27 so as to be retained therein by a metal piece 28. Meanwhile, a claw member 29 disposed on the upper base portion 13 in a position confronting the hollow raised portion 22 of the bracket member 12 is provided with a rectangular opening 30 in its central portion through which a rod 31 of a corresponding rectangular cross section extends. A pin-like projection 32 provided at the central upper portion of the rod 31 engages a recess 33 formed in a corresponding outer surface of the claw member 29, while a tension spring 35 is connected between one end of the rod 31 and a projection 34 provided on the upper base portion 13 in a position remote from the rod 31 through the interior of the raised portion 22. In the manner as described above, the rod 31 and claw member 29 are urged toward the raised portion 22, and in the peripheral surface of the raised portion 22, recesses 36 and 37 are formed with an interval therebetween larger than the width of the claw member 29. On the under surface of the cover plate 18, there are formed a pair of spaced projecting walls or stop walls 38 and 39 (FIG. 4), with which opposite side edges 29a and 29b of the claw member 29 are held in contact. The lever switch L is further associated with cancel pins 40 positioned in the vicinity of the steering wheel (not shown) to which the body frame 17 is secured and which pins 40 are arranged to rotate simultaneously with the rotation of the steering wheel. The rod 31 mentioned earlier is located in the locus of rotation of the cancel pins 40 shown by chain line in FIG. 4. At the inner portion on the bottom surface of the body frame 17, there is provided a generally V-shaped recess 41 which is made deeper by a predetermined amount around its central portion 41a for use in the so-called "lane changing" made, which portion 41a, the plunger 26 urged by the compression spring 27 contacts. The arm portions 15 of the bracket member 12 respectively have formed therein holes or bores 42 (FIG. 5), in positions corresponding to the projections 10 of the lever holder 7 described earlier, and in each of the bores 42, a plunger or movable piece 43 is accommodated together with a biasing coil spring 44 and is retained thereat by a retainer 45, and thus the plungers 43 respectively contact V-shaped inner surfaces 10a of the projections 10 of the lever holder 7. A rod 46 is slidably accommodated in an opening 47 formed in the base portion of one of the projections 10, for example, the projection 10 adjacent to the recess 5 of the control lever 1 as shown in FIG. 5, and is urged by a torsion spring 48 so as to be in contact at its one end with the recess 5, especially the inclined surface 6 at the edge of the recess 5 of the control lever 1 in a similar manner as for the torsion spring 24 for the control lever 1 described earlier, while the other end of the rod 46 extends outwardly from the body frame 17. Another rod 49 (FIG. 4) has one end inserted in an opening 50 formed in the upper base portion 13 of the bracket member 12, with the other end of the rod 49 extending outwardly from the body frame 17 at the side thereof remote from said rod 46. The rod 49 is referred to as a first rod, while the rod 46 is denoted as a second rod hereinbelow and these rods serve as operating members for switches described hereinafter.

Figure 4:
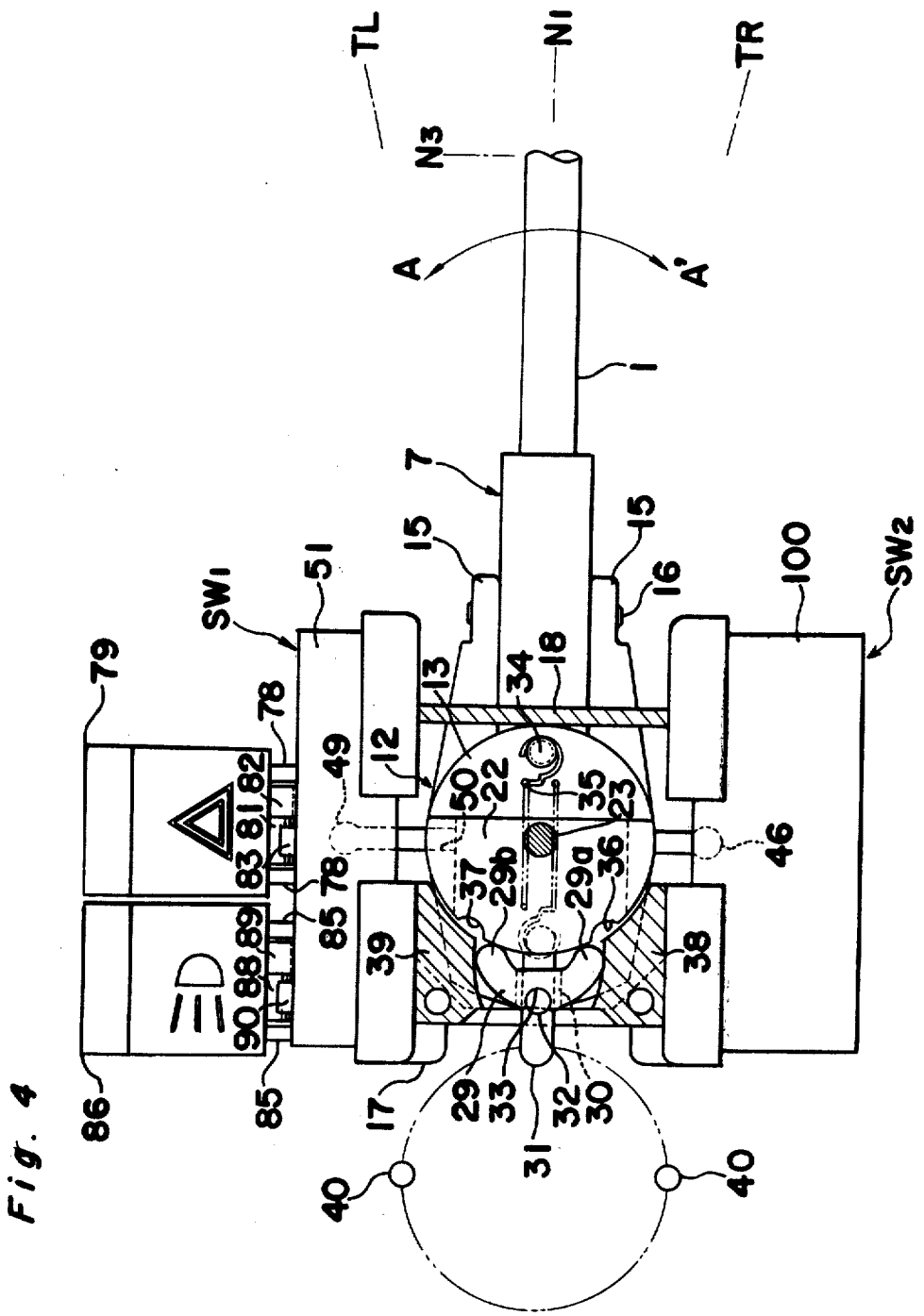
FIG. 4 is a top plan view, partly in section, of the arrangement of FIG. 1.
Figure 6:
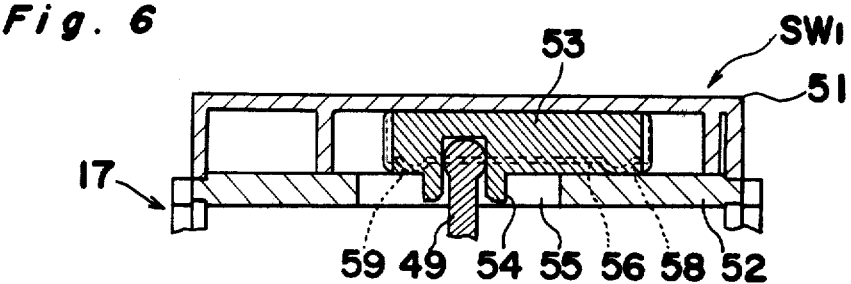
FIG. 6 is a side sectional view showing the structure of a first switch portion employed in the arrangement of FIG. 1.

Still referring to FIG. 4, an outer casing 51 for a first switch member SW1 is resiliently mounted on one side (upper portion in FIG. 4) of the body frame 17 so as to surround the first rod 49, and in the above outer casing 51, there are incorporated a base plate or substrate 52 and a contact holder 53 (FIGS. 6 and 7) arranged to slide over the surface of said substrate 52. The one end of the first rod 49 extending through an elongated opening 55 of the substrate 52 engages a bifurcated engaging portion 54 of the contact holder 53. A contact plate 56 having spaced contacts 58 and 59 provided at its opposite ends is supported on the contact holder 53 together with a biasing plate spring 57 (FIG. 7) so as to be urged toward the substrate 52. It is to be noted here that the plate spring 57 is employed for urging the contact plate 56 as described above, since such plate spring is effective for reducing the thickness of the lever switch as a whole together with simplification of the assembly thereof, and that plate springs are also employed for contact plates to be described later for a similar reason.

Figure 5:
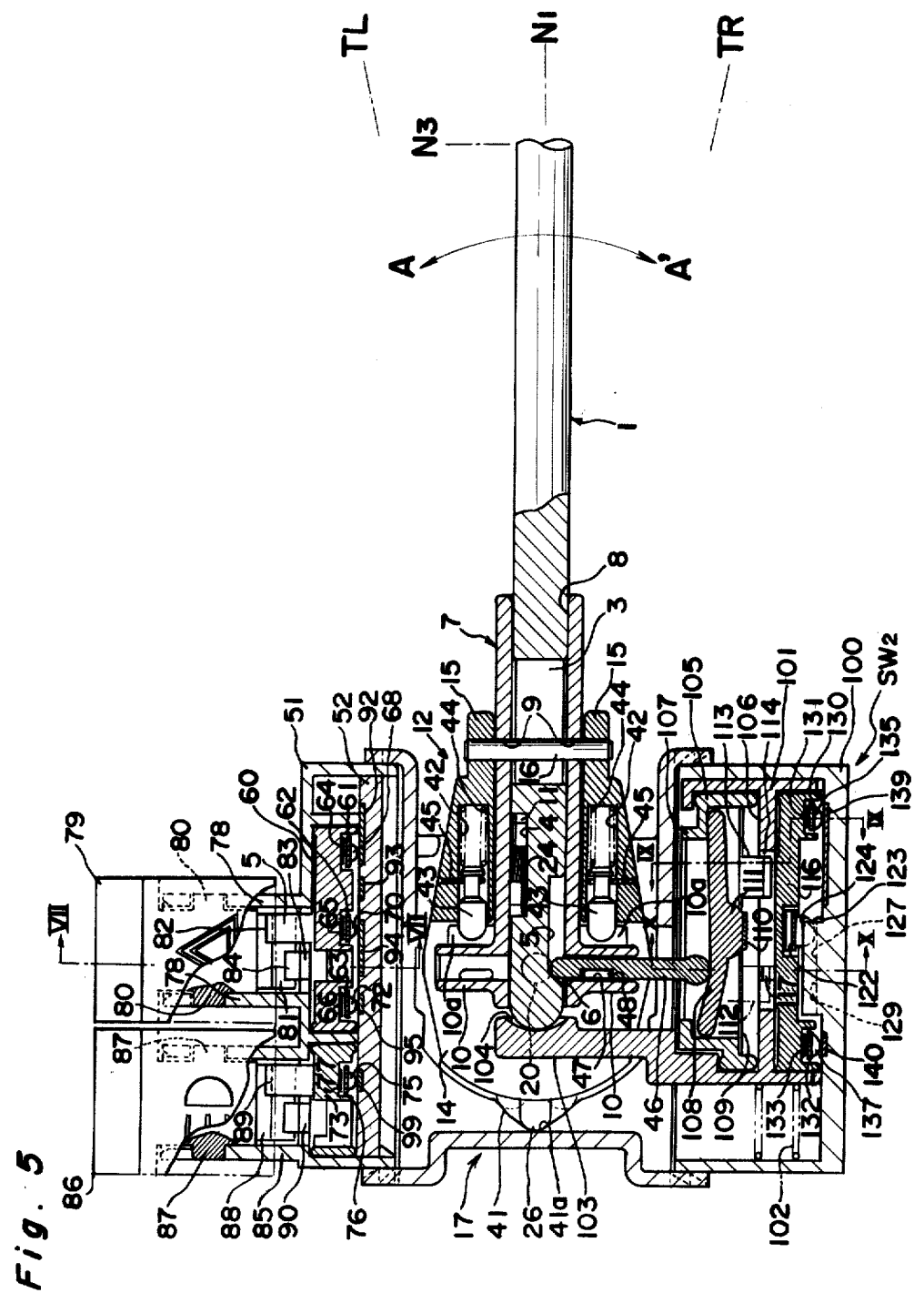
Figure 7:
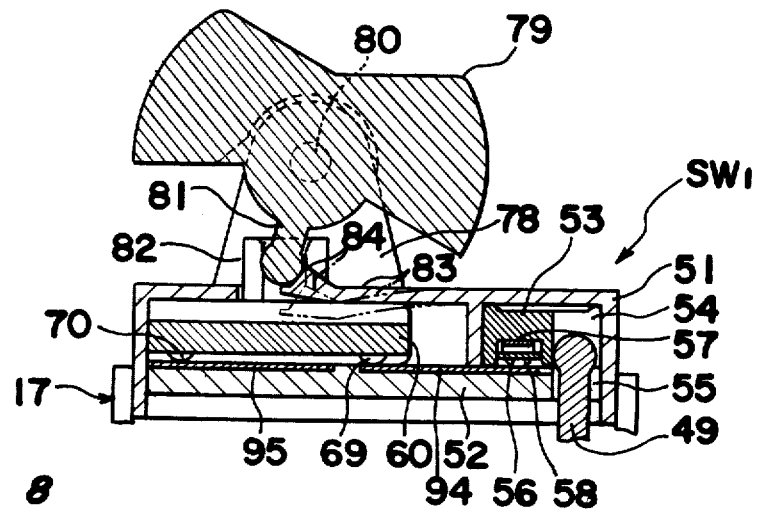
FIG. 7 is a cross section of the first switch portion taken along the line VII—VII in FIG. 5.

As shown in FIG. 7, the outer casing 51 further includes another contact holder 60 provided in a portion at the left side of the contact holder 53 so as to slide over the surface of the substrate 52 in a direction intersecting at right angles with the contact holder 53. On the contact holder 60, there are mounted contact plates 61, 62 and 63 together with corresponding plate springs 64, 65 and 66 for urging the contact plates as shown in FIG. 5, while the contact plate 61 is provided with spaced contacts 67 and 68, contact plate 62 has spaced contacts 69 and 70, and contact plate 63 is provided with spaced contacts 71 and 72 respectively at opposite end portions thereof as is most clearly seen from FIG. 8. In addition to the above contact holder 60, there is provided in the outer casing 51 a further contact holder 73 which supports a contact plate 76 having spaced contacts 74 and 75 at its opposite edges together with an urging plates spring 77 (FIG. 5). A pair of bifurcated support members 78 are provided on the outer casing 51 in positions corresponding to the contact holder 60. Pin-like projections 80 provided on opposite side edges of a rocking type control button 79 are rotatably supported by the bifurcated support members 78, while a control piece 81 of the control button 79 is engaged with a bifurcated engaging portion 82 of the contact holder 60, and also with one side of a projecting portion 84 at the forward end of the spring member 83 integrally formed with the outer casing 51. Moreover, on the outer casing 51 in positions corresponding to the contact holder 73, there are provided another pair of bifurcated support members 85, in which another rocking type control button 86 similar to the control button 79 is rotatably supported by pin-like projections 87 projecting outwardly from opposite side edges of the control button 86. A control piece 88 of the control button 86 is arranged to engage a bifurcated engaging portion 89 of the contact holder 73 and also one side of a projection 91 at the forward end of a spring member 90 integrally formed with the outer casing 51.

Figure 8:
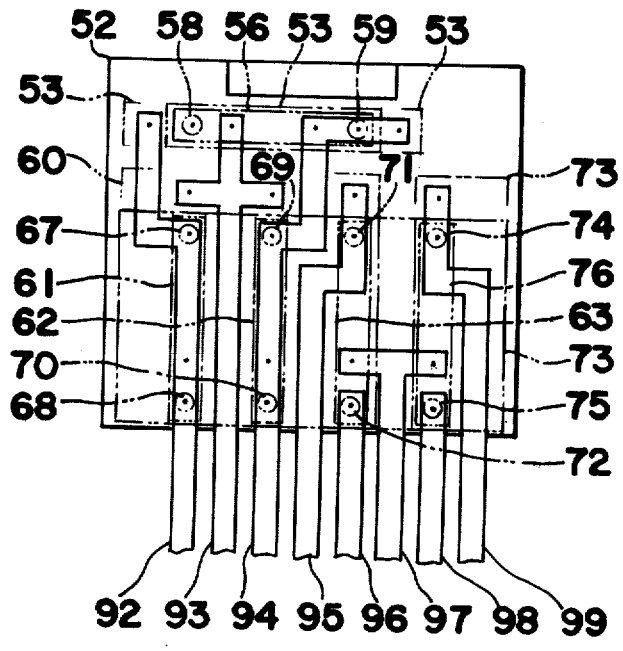
FIG. 8 is a top plan view showing the inner surface of the first switch portion employed in the arrangement of FIG. 1.

In FIG. 8, as compared with the contacts plates described above which are respectively mounted on the contact holder 53, 60 or 73 for simultaneous movement therewith and which may be called movable contact plates, contact plates 92, 93, 94, 95, 96, 97, 98 and 99 are fixedly mounted on the substrate 52, the contact plate 92 being connected to a small lamp for the right-turn signal, contact plate 93 to a small lamp for the left-turn signal, contact plate 94 to an output side of a flasher, contact plate 95 to an input side of the flasher, contact plate 96 to one side of the battery through a power switch, contact plate 97 to the other side of the battery other than through the power switch, contact plate 98 to the side of the battery through the power switch, and contact plate 99 to small side lamps for indication of vehicle width, etc. Furthermore, during manufacture, all the stationary contact plates 92 to 99 as described above are arranged to be formed by simultaneous punching from one electrically conductive sheet for one-piece molding with the substrate 52, while the movable contact plates described earlier are all the same size and configuration for ease of production. The other movable and stationary contact plates described hereinbelow are also arranged in a similar manner as above.

Figure 10:
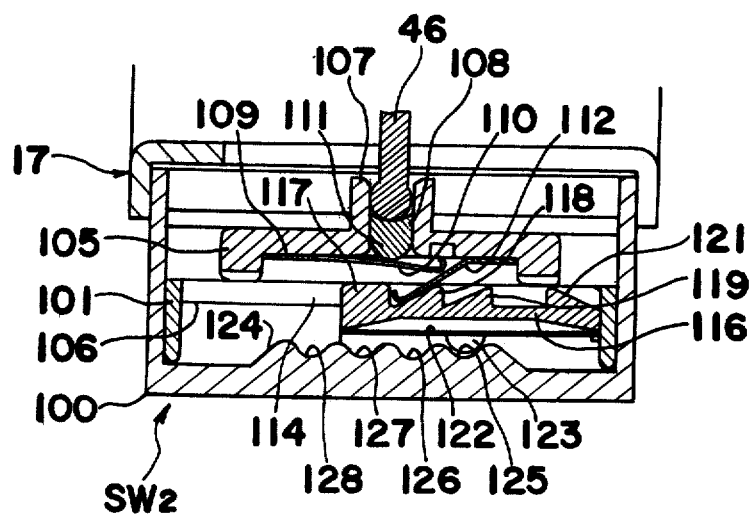
FIG. 10 is a cross section of the second switch portion taken along the line X—X in FIG. 5.
Figure 11A:
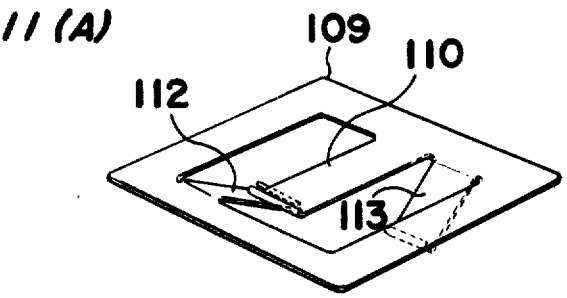
FIG. 11(A) is a perspective view of a contact holder employed in the second switch portion of FIG. 9.

On the other hand, as shown in FIG. 4, another outer casing 100 for a second switch member SW2 is also resiliently mounted on the other side (lower portion in FIGS. 4 and 5) of the body frame 17 so as to surround the second rod 46 described earlier, and in the outer casing 100, an inner casing 101 (FIG. 5) is incorporated together with a compression spring 102 for urging said inner casing 101 towards the control lever 1. A receiving piece 103 provided on the inner casing 101 and extending into the body frame 17 is arranged to be in pressure contact, at a recess 104 of semi-spherical cross section formed in the distal end thereof, with the rounded corresponding end of the control lever 1. The recess 104 is intended to cause the receiving piece 103 to precisely follow the operation or movement of the control lever 1 in first and second directions described later. The inner casing 101 is divided into a side adjacent to the body frame 17 and a side remote from said body frame 17 by a partition frame 106, and in the side adjacent the body frame 17, there is incorporated an intermediate member holder 105 which is arranged to be laterally movable in FIGS. 9 and 10, while the end of the second rod 46 described earlier is engaged with a bifurcated engaging piece 107 on the holder 105 laterally extending in FIG. 5. More specifically, an intermediate member 108 is accommodated in the holder 5, while the surface of the member 108 opposite to a portion in the vicinity of a projection 111 thereof contacts the rod 46 under pressure by the urging force of an intermediate spring piece 110 of a plate spring 109 also built in the holder 105 and contacting the projection 111. The base portion thereof contacts the inner surface of the inner casing 101 under pressure. In addition to the intermediate spring piece 110 described above, the plate spring 109 also has spring pieces 112 and 113 bent in first and second directions out of the plane of plate spring 109 to a degree greater than that at which the intermediate spring piece 110 is urged out of such plane, larger than that of the intermediate spring piece 110 as shown in FIG. 11(A). Accordingly, respective ends of the spring pieces 112 and 113 are located inside the partition frame 106, while the end of the intermediate spring piece 110 is only directed toward the interior of said partition frame 106. The partition frame 106 is provided with a projecting wall 114 extending toward one side of the inner periphery of the frame 106, and also with another corresponding projecting wall 115 extending towards the other side thereof, with the spring piece 113 of the spring plate 109 contacting the projecting wall 114, while the spring piece 112 contacts the projecting wall 115. (FIG. 11(B))

Figure 11B:
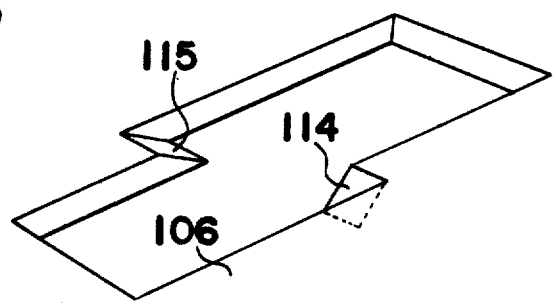
FIG. 11(B) is a perspective view of a spring plate engaging member employed in the second switch portion of FIG. 9.
Figure 11C:
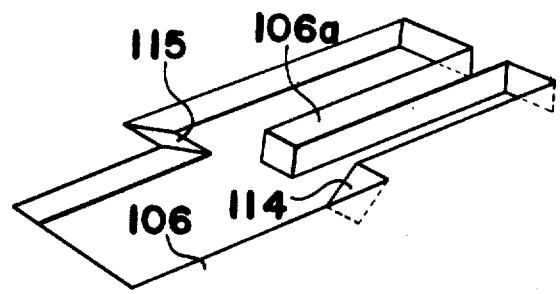
FIG. 11(C) is a view similar to FIG. 11(B) which particularly shows a modification thereof.

It should be noted here that the structure of the partition wall 106 as shown in FIG. 11(B) may be further modified as in FIG. 11(C) in which another intermediate projection 106a extends between the walls 114 and 115 in parallel and spaced relation to the projecting wall 114, with the intermediate spring piece 110 of the plate spring 109 being directed, at a half of its base portion, toward the projection 106a. The provision of the intermediate projection 106a is effective for preventing malfunction of the lever switch L as described in detail later.

Figure 11D:
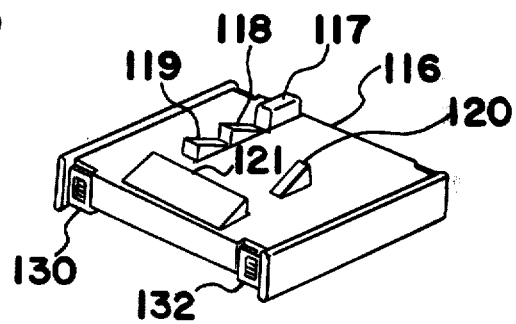
FIG. 11(D) is a perspective view of a partition wall with projections employed in the second switch portion of FIG. 9.
Figure 12:
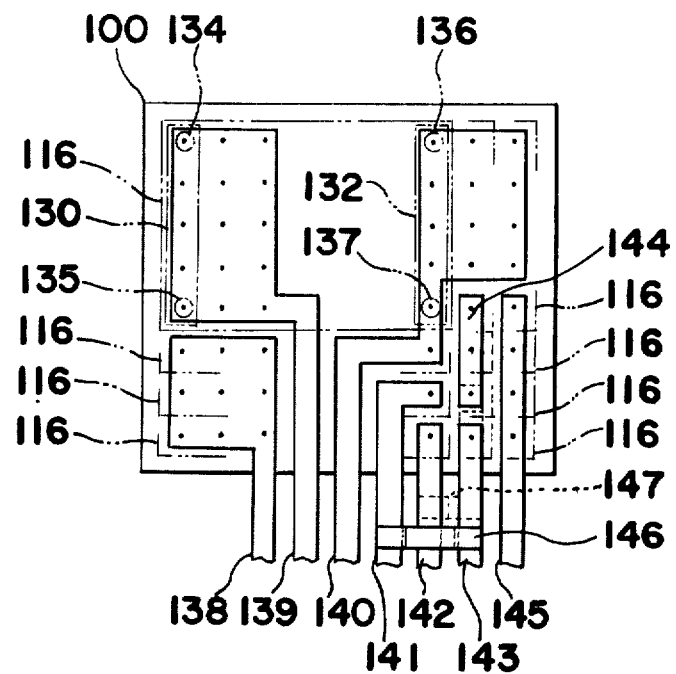
FIG. 12 is a top plan view of a substrate or base plate of the second switch member of FIG. 9.

Referring to FIG. 11(D), there is shown a contact holder 116 incorporated in the side of the inner casing 101 opposite to the body frame 17. The contact holder 116, at one side of its surface facing the plate spring 109, has a projection 117 of rectangular cross section and projections 118 and 119 each of right-angled triangular cross section which are aligned in a line, and on the other side of said surface, has a projection 120 of right-angled triangular cross section directed in a direction opposite to that of the projections 118 and 119, while at the side of said surface extending along the above projections 117, 118, 119 and 120, there is formed an elongated projection 121 having right-angled triangular cross section directed in the same direction as the projection 120 and spaced from the projections 119 and 120 a distance equivalent to the length of each of said projections 119 and 120. On the contrary, as shown in FIGS. 5 and 10, at approximately a central portion on the surface of the contact holder 116 opposite to the surface thereof facing the plate spring 109, there is supported a plate spring 122 having at its central portion, a protrusion 123, which is engaged with one side of a right-most notch 125 of a plurality of detent notches 125, 126, 127 and 128 for a detent arrangement 124 provided at approximately a central portion of the inner face of the outer casing 100, while a small detent notch 129 is provided at the other side of the detent arrangement 124 in common with the notches 125 to 128. Meanwhile, on one side of the outer face of the contact holder 116, is a movable contact plate 130 together with a plate spring 131 so as to be urged toward the inner surface of the outer casing 100, and further, another movable contact plate 132 is also provided the other side of the outer surface of the contact holder 116 together with a plate spring 133 so as to be similarly biased toward the inner face of said outer casing 100. As shown in FIG. 12, the contact plate 130 has spaced contacts 134 and 135 at its opposite ends, and the contact plate 132 is provided with spaced contacts 136 and 137 at its opposite ends. On the contrary, stationary contact plates 138, 139, 140, 141, 142, 143, 144 and 145 are arranged on the inner face of the outer casing 100, in which, the contact plate 138 is connected, for example, to small lamps related to auxiliary lights, contact plate 139, to one side of the battery through the power switch, contact plate 140, to the side of the battery other than through the power switch, contact plate 141 to the head lamps for low beam, contact plate 142 to the head lamps for high beam, contact plate 143 to the contact plate 141 and consequently to the head lamps for low beam through a connector plate 146, contact plate 144 to the contact plate 142 and consequently the head lamps for high beam through a connector plate 147, and contact plate 145 to the horn, respectively.

Figure 13:
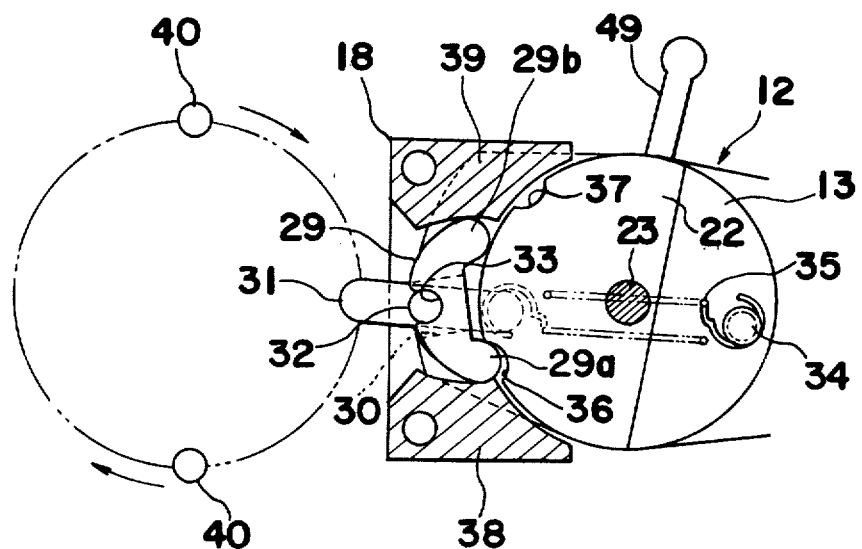
FIG. 13 is a fragmentary top plan view in section of the arrangement of FIG. 4 explanatory of the function thereof.

By the above arrangement, the control lever 1 is rotatable about the pin projections 20 and 23 (FIG. 3) of the bracket member 12 together with the lever holder 7 in the direction shown by the arrows A and A' in FIGS. 4 and 5 (upwardly and downwardly in FIGS. 4 and 5), i.e. in the first direction of rotation, and is also rotatable about the pin 16 together with the lever holder 7 in the direction shown by the arrows B and B' in FIG. 3 (upwardly and downwardly in FIG. 3), i.e. in the second direction of rotation. In addition, the control lever 1 can be independently pushed in or withdrawn in the axial direction thereof a distance equivalent to the length of the elongated opening 3 with respect to the pin 16. Normally, with respect to the first direction of rotation, the control lever 1 is held at an original or neutral position N1 where it is not shifted either in the direction of the arrow A or in the direction of the arrow A' in FIGS. 4 and 5 by the pressure contact of the plunger 26 urged by the compression spring 27 with the central portion or, as it were, the root or bottom of the recess 41, while with respect to the second direction of rotation, the lever 1 is normally held at a neutral position N2 where it is not shifted either in the direction of the arrow B or in the direction of the arrow B' in FIG. 3 by the pressure contact of the plungers 43 urged by the compression springs 44 with the bottom portions of the V-shaped inner surfaces 10a of the projections 10 for the lever holder 7. Furthermore, with respect to the axial direction, the control lever 1 is held at a neutral position N3 where it is not shifted either to the pushed-in position or the withdrawn position by the urging force of the torsion spring 24 imparted to the opposite edges of the notch 4 of the lever 1. Accordingly, the control lever 1 is operated in the first direction of rotation against the biasing force of the compression spring 27, and in the second direction of rotation against the biasing force of the compression springs 44, and further in the axial direction against the biasing force of the torsion spring 24 respectively. In the above arrangement, when the control lever 1 is operated in the direction of the arrow A' in the first direction in FIGS. 4 and 5 against the urging force of the compression spring 27, the first rod 49 provided on the bracket 12 which rotates clockwise following the operation of the lever 1, moves toward the right in FIGS. 4 and 6 (towards the left in FIG. 8) in the outer casing 51 of the first switch SW1 so as to shift the contact holder 53 in the same direction, and thus, the contact 58 of the contact plate 56 is brought into contact with the contact plate 92, and the contact 59 thereof slides along the contact plate 94. In other words, the circuit for the right-turn and left-turn signals through the power switch and flasher is connected to the small lamp for the right-turn signal for intermittently illuminating said small lamp. Meanwhile, in the above case, the bracket member 12 rotated in the clockwise direction in FIG. 4 as described earlier brings the recess 36 into alignment with the one side edge 29a of the claw member 29, whereby the claw member 29 urged by the tension spring 35 through the pin projection 32 and the rod 31 causes said one edge 29a thereof to fit into the recess 36, and thus, the bracket member 12 subjected to a detent action and thereby is stopped so as to hold the control lever 1 at the right-turn signal position TR shown in FIG. 4. In the above case, the positions of the parts around the claw member 29 are as shown in FIG. 13, in which the cancel pin 40 is moved clockwise as indicated by the arrow, since the steering wheel (not shown) is first rotated in the right-turn direction. However, in the above direction, the rod 31 depressed by the cancel pin 40 only rotates the claw member 29 about its one side edge 29a engaging the recess 36 so as to merely separate the other side edge 29b from the bracket member 12, and said one side edge 29a of the claw member 36 continues to be engaged with the recess 36 to hold the control lever 1 at the right-turn signal position TR described earlier. However, when the steering wheel is rotated in the reverse direction after the right-turn, the cancel pin 40 strikes against the rod 31 in the opposite direction to the above for rotating the claw member 29 about its other side edge 29b engaging the other wall 39 so as to disengage the one side edge 29a of the claw member 29 from the recess 36, and thus, the bracket member 12 is released from the restriction. Accordingly, the plunger 26 urged by the compression spring 27 is shifted to a higher position shown by a chain line at the upper portion in FIG. 5 beyond the portion in the vicinity of the central portion 41a of the recess 41, but upon releasing of the restriction of the bracket member 12 as described above, the plunger 26 is subjected to the accumulated biasing force of the compression spring 27 and slides over the inclined surface of the recess 41 down to the central portion 41a thereof so as to return the bracket member 12 and consequently, the control lever 1 to the neutral position N1. Therefore, in the above operation, the contact holder 53 in the outer casing 51 of the first switch X is also returned by the first rod 49 during its returning movement so as to disconnect the contact 28 of the contact plate 56 from the contact plate 92 and to de-energize the small lamp for the right-turn signal for extinguishing said small lamp. On the contrary, when the control lever 1 is operated upwardly or in the direction of the arrow A in FIG. 4, all parts function in the reverse order to that described above. More specifically, the contact holder 53 is moved towards the left in FIG. 6 and towards the right in FIG. 8 and connects the contact plate 93 with the contact plate 94 so as to intermittently illuminate the small lamp for the left-turn, while the claw member 29 holds the control lever 1 at the left-turn signal position TL shown at the upper part in FIG. 4 by engaging the other side edge 29b thereof with the recess 37. Moreover, the cancel pin 40 causes the other side edge 29b of the claw member 20 to be disengaged from the recess 37 for releasing the bracket member 12 from its restriction, only by the movement thereof upon rotation of the steering wheel in the left-turn direction. When the bracket member 12 is released from its restriction as described above, the control lever 1 is also returned to the neutral position N1 by the function of the plunger 26 sliding down the inclined face of the recess 41 in the manner opposite to that described earlier, and the small lamp for the left-turn signal is de-energized.

Figure 9:
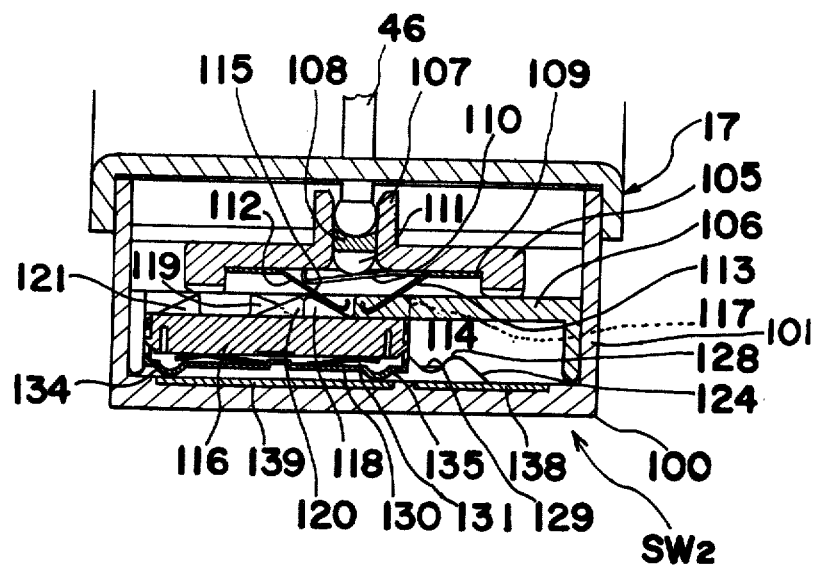
FIG. 9 is a cross section of a second switch portion taken along the line IX—IX in FIG. 5.

Subsequently, when the control lever 1 is operated in the direction of the arrow B of the second direction, the second rod 46 provided on the lever holder 7 rotating with the lever 1 moves rightward in FIG. 9 (leftward in FIG. 10) within the outer casing 100 of the second switch SW2 and inner casing 101 so as to shift the intermediate member holder 105 in the same direction. Accordingly, the holder 105 pushes the erect surface of the projection 117 of the contact holder 116 by the forward end of the spring piece 112 at the one side of the plate spring 109, and causes the contact holder 116 to move further rightward in FIG. 9 (leftward in FIG. 10) for advancing the projecting portion 123 of the plate spring 122 by one pitch from the notch 125 to neighboring notch 126 of the detent notches 124. Therefore, the contact plates 130 and 132 are also shifted one step downward in FIG. 12 and change over the contacting state of the contact 135 from its contact with the contact plate 139 to contact with the contact plate 138, with the contacts 136 and 137 remaining in contact with the contact plate 140. In other words, the small lamps for the auxiliarly lights are connected to the battery circuit for illuminating said small lamps. Accordingly, upon operation of the control lever 1 in the above described manner, the plungers 43 only slide along the V-shaped inner surfaces 10a of the projections 10 of the lever holder 7, while compressing the corresponding springs 44 for accumulating therein more elastic force, and when the lever 1 is released from the operation, the plungers 43 slide down the V-shaped inner surfaces 10a of the projections 10 toward the central portions thereof due to the biasing force accumulated in the compression spring 44 for automatically and instantly returning the control lever 1 released from the operating force to the neutral position N2. In the above case, together with the returning of the control lever 1 in the above described manner, the intermediate member holder 105 is also returned by the second rod 46, but the contact holder 116 is held in its position after the movement by the engagement of the projecting portion 123 of the plate spring 122 with the notch 126 of the detent notches 124. Therefore, the holder 105 is independently returned by causing the spring piece 112 of the plate spring 109 to ride over the inclined face of the projection 118, with the contact holder 116 being left in its position after the movement. In other words, the control lever 1 is allowed to return, since the intermediate member holder 105 can be returned (FIG. 14). In the above state, when the control lever 1 after the return is again operated forward, the movement of the parts is generally similar to the above, but in this case, the intermediate member holder 105 depresses the erect face of the projection 118 by the forward end of the spring piece 112 of the spring plate 109 so as to move the contact holder 116 further to the right in FIG. 14, while the contact plates 130 and 132 are also moved one step downward in FIG. 12, and this changes over the contact state of the contact 137 from the contact plate 140 to the contact plate 141, with the contacts 135 and 136 respectively contacting the contact plates 138 and 140, and thus, the small lamps for the auxiliary lights and head lamps for the low beam are connected to the battery circuit for being illuminated. Needless to say, in the above case, the control lever 1 is also automatically returned to the neutral position N2 in a similar manner as described earlier after the releasing operation of said lever 1, while the intermediate member holder 105 independently returns by causing the spring piece 112 of the plate spring 109 to ride over the inclined face of the projection 119 subsequent to the projection 118, with the contact holder 116 being left at the position where the projecting portion 123 of the plate spring 112 engages the notch 127 of the subsequent one of the detent notches 124, i.e. at the position where the small lamps and low beam head lamps are lit.

In the above case where the holder 105 returns in the above described manner, there is a possibility that the spring piece 113 of the plate spring 109 will push the erect face of the projection 120 for returning to the contact holder 116 or to obstruct the returning of the control lever 1. However, in the case of the foregoing embodiment, the spring piece 113 of the plate spring 109 is arranged to ride over the wall 114 at the one side of the partition frame 106 every time the holder 105 moves rightward in FIGS. 9 and 14 (left-ward in FIG. 10), and upon returning from the above riding over position, goes beyond the projection 120 without contacting the erect face of said projection 120. Therefore, the contact holder 116 is not returned after all, and there are no difficulties in maintaining the setting of the light control or in returning the control lever 1. Upon forward operation of the control lever 1 after the returning once again, the spring piece 112 of the plate spring 109 engages the erect face of the projection 119, i.e. by the intermediate member holder 105 which shifts the contact holder 116 further downward by one step in FIG. 12, the contacting state of the contact 137 with the contact plate 141 is changed over to the contact plate 142, with the contacts 134, 135 and 136 for the contact plates 130 and 132 respectively contacting the contact plates 139, 138 and 140, and thus, the head lamps for high beam are connected to the battery circuit for being illuminated instead of the low beam head lamps. Of course, in the above case also, the control lever 1 itself is automatically returned to the neutral position N2 and the intermediate member holder 105 is also returned, and by the engagement of the projecting portion 123 on the plate spring 122 with the last notch 128 of the detent notches, only the contact holder 116 is maintained in the state where the high beam head lamps are illuminated. It should be noted that any further forward operation of the control lever 1 has no effect, since there is no further projection on the contact holder 116 to be engaged by the spring piece 112 of the spring plate 109, and moreover, said spring piece 112 becomes ineffective as it rides over the projection 121. In the above state, however, upon operation of the control lever 1 in the opposite direction (i.e. downward or in the direction of the arrow B' in FIG. 3), the second rod 46 moves in the direction opposite to the above, with consequent reverse movement of the intermediate member holder 105 also. In the above movement in the opposite direction, the other spring piece 113 takes the place of the spring piece 112 of the plate spring 109 described thus far, and first engages the erect surface of the projection 121 of the contact holder 116 which has reached the position for lighting the high beam head lamps described earlier for returning the contact holder 116 one step upward in FIG. 12, and therefore, the dimmer control is effected in which the high beam head lamps illuminated earlier are extinguished so that the low beam head lamps are again lit instead of said high beam head lamps. Needless to say, in the above case, the automatic returning of the control lever 1 is also effected in the similar manner to that described earlier, although in a different direction. After the returning of the lever 1, if said control lever 1 is again operated backward or in the direction of the arrow B' in FIG. 3, however, in the above state, the contact holder 116 has no projection to be engaged by the spring piece 113 of the plate spring 109, and is only provided with the projection 119 which is engaged by the spring piece 112, i.e. which is arranged to change over from the state where the low beam head lamps are lit to the state where the high beam head lamps are illuminated. On the contrary, in the above state, when the control lever 1 is withdrawn in the axial direction against the urging force of the torsion spring 24, the second rod 46 pushed by the inclined face 6 of the notch 5 of the control lever 1 projects into switch case 100 to a larger extent than before so as to depress the intermediate member 108 which in turn, pushes down the intermediate spring piece 110 of the spring plate 109 to bring the end of said spring piece 110 in front of the erect face of the projection 121. Therefore, when the control lever 1 is operated backward in the above state, following the movement of the holder 105 in the similar manner as described earlier, the intermediate spring piece 110 of the plate spring 109 engages the erect surface of the projection 121 so as to cause the contact holder 116 to further return by one step upward in FIG. 12, and thus, the low beam head lamps are also extinguished, with only the small lamps remaining lit. The variations in operation as described above are provided because repeated operation of the control lever 1 only in the backward direction may result in the possibility that in driving the motor vehicle during the night time, etc., the head lamps may be undesirably extinguished and in short, it is intended to protect the driver or person riding with the driver from dangers arising from careless operation. After the operation as described above, the control lever 1 is automatically and instantaneously returned to the neutral position N3 in the axial direction thereof, while by the urging force of the compression springs 44 through the plungers 43, and projections 10 on the lever holder 7, it is also automatically and instantaneously returned to the neutral position N2 for the second direction of rotation. Accordingly, the second rod 46 is also returned by the biasing force of the torsion spring 48, with the intermediate member 108 being returned together with the intermediate spring piece 110 of the plate spring 109. In the above case, the spring piece 112 of the plate spring 109 which rides over the projection 115 at the other side of the partition wall 106 during each operation from the previous stage is returned over the projection 119 and thereafter, over the projection 118. Therefore, by again operating the control lever 1 backward, the erect face of the projection 120 is engaged by the spring piece 113 of the plate spring 109 so as to positively return the contact holder 116 one further step upward in FIG. 12, and thus, the small lamps are also put out to return the light system to a completely extinguished state. Of course, in the above case, the automatic returning of the control lever 1 is also effected in a similar manner to that described earlier, and even if the control lever 1 returned to the original position is again operation backward, such operation of the lever 1 has no effect, since the contract holder 116 is not provided with any projection to be engaged by the spring piece 113 of the plate spring 109. Needless to say, in the above operation, the advancing or returning of the contact holder may be effected from any stage instead of being effected only from the last step of each stage.

In connection with the above, the provision of the intermediate projection 106a formed in the partition frame 106 as shown in the modification of FIG. 11(C) provides the following favorable effects.

More specifically, in the position where the high beam head lamps are lit in the last step as described above, the lamps may be brought back to the state where the low beam head lamps are illuminated by operating the control lever 1 backward as described earlier, but in effecting dimmer control, when the control lever 1 is erroneously operated in a way different from the normal operation as described in the foregoing and in such a manner that the lever 1 is operated forward in the opposite direction so as to be returned to the neutral position N2 while also being withdrawn in the axial direction, if the partition frame 106 is not provided with the intermediate projection 106a, there is a possibility that the spring piece 110 of the plate spring 109 depressed by the intermediate member 108 engages the projection 121 to shift the contact holder 116 to the position for illuminating the low beam head lamps. However, according to the modification of FIG. 11(C), the intermediate projection 106a of the partition wall 106 prevents the spring piece 110 of the plate spring 109 from projecting excessively and to such an extent that the spring piece 110 can not engage the projection 121, and consequently, the wrongly effected the dimmer control in a manner different from the normal operation therefore can be advantageously prevented.

With respect to the foregoing operations, when the control lever 1 is axially pushed in against the force of the torsion spring 24, the inner casing 101 of the second switch SW2 the receiving piece 103 of which is engaged by the base end of the control lever 1 is shifted, together with the intermediate member 108 and holder 105 accommodated therein and also with the contact holder 116, toward the left in FIG. 5 (or toward the right in FIG. 12), and if the operation of the control lever 1 is stopped at a position where contact of the projecting portion 123 of the plate spring 122 with the small notch 129 of the detent notches 124 is felt, the respective contact plates 130 and 132 cause the high beam head lamps to be illuminated by the change-over of the contact 137 of the contact plate 132 from the contact plate 140 to contact plate 144 from the completely extinguished state or the state where the small lamps are illuminated, and thus cause the high beam head lamps to be illuminated while extinguishing the low beam head lamps, by changing over the contacting state of said contact 137 with the contact plate 141 to the contact plate 144 from the state where the low beam head lamps are illuminated, and further cause the low beam head lamps to be lit while extinguishing the high beam head lamps by changing over the contacting state of the contact 137 from the contact plate 142 to the contact plate 143.

On the contrary, when the control lever 1 is pushed in to a position such that the projecting portion 123 of the plate spring 122 goes over the small notch 129 of the detent notches 124, the contact 137 is brought into contact with the contact plate 145 in all cases to sound the horn. Therefore, even during the push-in operation of the control lever 1 as described above, the control lever 1 is automatically returned after being released, by the biasing force of the torsion spring 24, and thus, through repetition of such operations in which the lever 1 is again pushed in after the returning thereof and is further returned after the operation thereof, the intermittent lighting of the high beam head lamps, changing over of lighting between the low beam and high beam head lamps, or intermittent sounding of the horn, etc. are effected to give signals for example, passing.

Meanwhile, with respect to the first switch portion SW1 described earlier, when the operating button 79 therefor is depressed, the contact holder 60 is shifted rightward in FIG. 7 (upward in FIG. 8) by the control piece 81, whereby the contact 67 on the contact plate 61 is changed over from contact with the contact plate 92 to contact with the contact plate 93, the contact 69 on the contact plate 62 is changed over from the contact plate 94 to the contact plate 93, and the contact 72 on the contact plate 63 is changed over from the contact plate 96 to the contact plate 97 respectively. Therefore, the small lamps for the right and left-turn signals are connected to the battery circuit only through the flasher without passing through the power switch for giving the so-called hazard signals by causing said small lamps to be intermittently illuminated. When the operating button 79 is operated in the above described manner, the above operating piece 81 goes over the spring piece 83 of the outer casing 51 while subjecting it to elastic deformation in addition to the shifting of the contact holder 60, and is thereafter held in this state after operation by the restoration of the spring piece 83, and thus, the contact holder 60 is also maintained at that position after the shifting, i.e. at the position where the above small lamps for the right and left-turn signals are intermittently illuminated. Needless to say, when the operating button 79 is operated in the reverse manner from the above state, all contacts are restored to the original positions, and both of the small lamps are completely extinguished and held in said state. On the other hand, when the other operating button 86 is depressed, the contact holder 73 is shifted upward in FIG. 8 by the operating piece 88, whereby the contact 75 of the contact plate 76 is changed over from contact with the contact plate 98 to contact plate 97, and thus, the small lamps indicating the vehicle width or side facing lamps are connected to the battery circuit other than through the power switch for providing signals indicating the vehicle is parked by illuminating said small lamps. In the above case also, the operating piece 88 goes over the spring piece 90 of the outer casing 51 while subjecting said spring piece 90 to elastic deformation, and thereafter, is held at the shifted position after the operation due to restoration of the spring piece 90 to its initial shape, and therefore, the contact holder 73 is maintained at the shifted position, i.e. in the state where the above described small lamps following the side lamps are lit. Upon operation of the operating button 86 in the reverse manner from the above state, the lamps are returned to the original state, so that the small lamps following the side lamps are extinguished and held in said de-energized state.

Reference is made to FIGS. 16 through 21, in which there is shown a second embodiment according to the present invention. The arrangement of FIGS. 16 to 21 is different from that in FIGS. 1 to 15 in that the switching for producing the right and left-turn signals in the first embodiment is replaced by switching for driving of so-called rear wipers and rear washers for the rear windshield, and also in that the light control is replaced by driving of the so-called front wipers and front washers for the front windshield.

Figure 17:
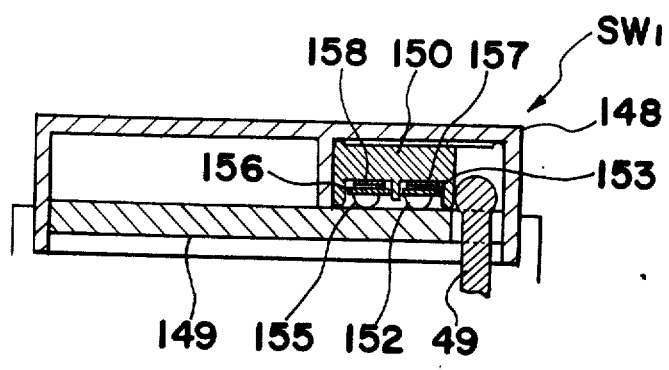
FIG. 17 is a view similar to FIG. 7 but particularly relates to the modification of FIG. 16.
Figure 18:
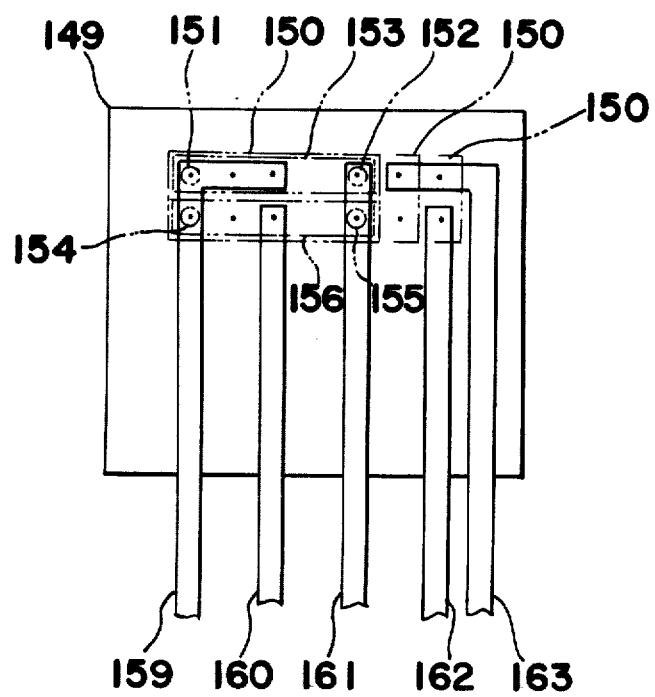
FIG. 18 is a view similar to FIG. 8 but particularly relates to the modification of FIG. 16.
Figure 19:
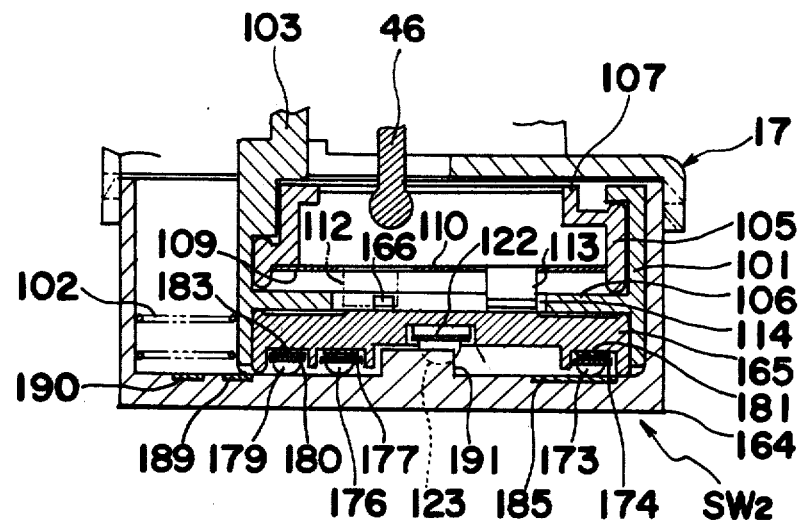
FIG. 19 is a view equivalent to the corresponding portion of FIG. 5 but particularly relates to the modification of FIG. 16.
Figure 20:
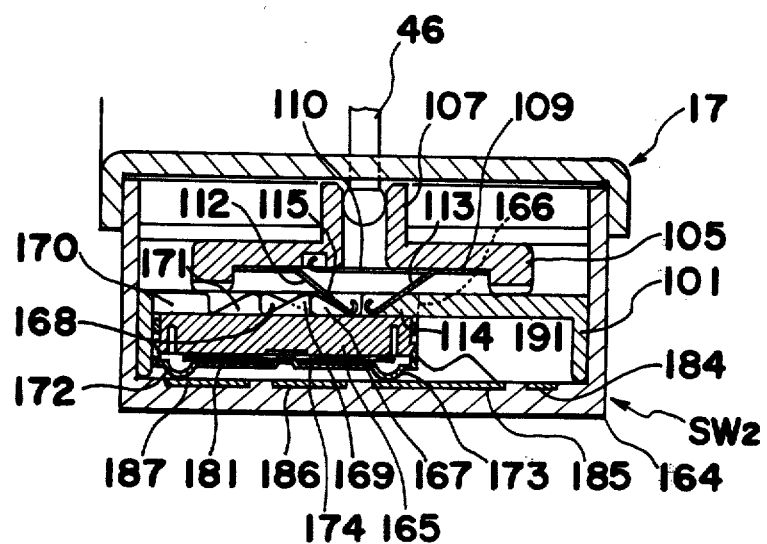
FIG. 20 is a view similar to FIG. 9 but particularly relates to the modification of FIG. 16.
Figure 21:
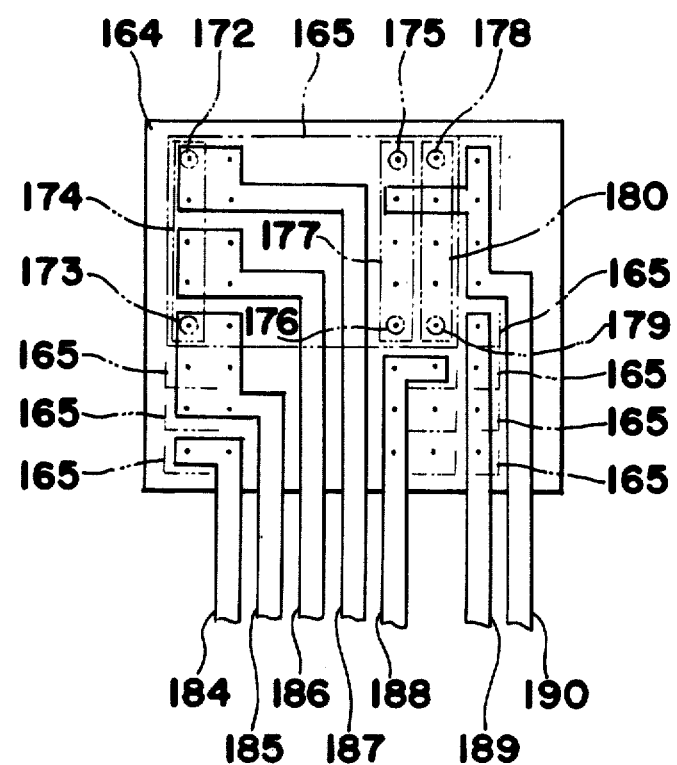
FIG. 21 is a view similar to FIG. 12 but particularly relates to a modification of FIG. 16.

In the second embodiment, particularly referring to FIGS. 16 to 18, the outer casing 51 of the first embodiment in FIGS. 1 to 15 is replaced by an outer casing 148 for the first switch SW1, while the base plate 52 is also replaced by a base plate 149, and the contact holder 53 is replaced by a contact holder 150. On the contact holder 150 are mounted on a contact plate 153 having contacts 151 and 152 and a contact plate 156 having contacts 154 and 155 together with corresponding biasing springs 157 and 158, while stationary contact plates 159, 160, 161, 162 and 163 are provided on the base plate 149. The contact plate 159 is connected to the motor for the rear windshield wipers, contact plate 161 to a cam contact for returning the rear windshield wipers to a rest position, contact plate 162 to the rear washer circuit of the battery, and contact plate 163 to the battery respectively. In the above arrangement, although not specifically shown, the control lever 1 is adapted to be operable in the first direction of rotation, with the position corresponding to the right-turn signal position TR in the first embodiment as the original position, to a position of a subsequent step equivalent to the neutral position N1 and to a position of the last step equivalent to the left-turn signal position TL in the first embodiment, while the lever 1 is also arranged so that it can be held in position at the original position and the position for the subsequent step, and at the position for the last step, a can be automatically returned to the position for the subsequent step after release of said lever 1. Therefore, in the construction as described above, when the control lever 1 is operated from the original position to the position for the subsequent step, the contact 152 of the contact plate 153 is changed over from the contact plate 161 to the contact plate 163 by the movement of the contact holder 150 toward the right in FIG. 18, and thus, the motor for the rear windshield wipers is connected to the battery for driving said motor and consequently driving the rear windshield wipers. When the lever is operated to the position of the last step from the position of the subsequent step the above state of operation of the upper motors is maintained, and the contact plate 156 moves contact point 154 into contact with the contact plate 160 from the position between the contact plates 159 and 160, and also the contact point 155 into contact with the contact plate 162 from the position between the contact plates 161 and 162, due to the further movement of the contact holder 150 toward the right in FIG. 18. Thus, the pump motor for the rear washers is connected to the rear washer circuit of the battery for driving said pump motor and consequently, the rear washers. In the above case, the rear windshield wipers continue to be driven as described earlier. Upon returning of the control lever 1 through the position where only the rear wipers are driven, to the original position, all operations are ended, and by contact of contact 152 with contact 161, the windshield wiper is returned to a rest position. As shown in FIGS. 19 to 21, the outer casing 100 of the first embodiment is replaced by an outer casing 164 for the second switch SW2, and the contact holder 116 thereof is also replaced by a contact holder 165. The contact holder 165 is provided with projections 166, 167, 168, 169 and 170 respectively replacing the projections 117 to 121 of the first embodiment, and also with a projection 171 aligned with the projection 169, while the intermediate member 108 is omitted from the intermediate member holder 105 for making it unnecessry to withdraw the control lever 1. Meanwhile, on the above contact holder 165, there are mounted a contact plate 174 having contacts 172 and 173, contact plate 177 having contacts 175 and 176 and contact plate 180 having contacts 178 and 179 together with the corresponding biasing plate springs 181, 183 and 183, and stationary contact plates 184, 185, 186, 187, 188, 189 and 190 are arranged on the inner surface of the outer casing 164. The contact plate 184 is connected to the high speed side of the front windshield wiper motor, contact plate 185 to the low speed side of said motor, contact plate 186 to the battery, contact plate 187 to a cam contact for returning the front windshield wiper to a rest position, contact plate 188 to an intermittent driving device connected to the front windshield wiper motor, contact plate 189 to the front washer pump motor, and contact plate 190 to the circuit of the battery for the intermittent driving device and front washer pump motor. Moreover, the detent notches 124 in the first embodiment are replaced by detent notches 191 smaller in width than the detent notches 124 for limiting the push-in operation of the control lever 1 to one step.

Accordingly, in the arrangement of FIGS. 16 to 21 as described above, when the control lever 1 is operated forward step by step in the second direction of rotation, in each of the steps wherein the contact holder 165 is advanced by the intermediate member holder 105 step by step downward in FIG. 21, the contact plate 177 first brings the contact 175, which is out of contact with the contact plate 190, into contact therewith, and also brings the contact 176, which is out of contact with the contact plate 188, into contact with said contact plate 188, whereby the intermittent functioning device is connected to the intermittent wiper circuit of the battery for driving said device and the front windshield wiper connected thereto, and consequently driving the front wipers. Subsequently, as the contact plate 174 changes over the contact 172 from the contact plate 187 to contact plate 186, with the contact 173 thereof held in contact with the contact plate 185, the low speed side of the front windshield wiper motor is connected to the battery for driving said motor and consequently the front windshield wiper at low speed, and finally, as the contact plate 174 changes over the contact 173 from the contact plate 185 to contact plate 184, with the contact 172 thereof remaining in contact with the contact plate 186, the high speed side of the front windshield wiper is connected to the batttery for driving said motor and consequently, the front windshield wipers at high speed. Needless to say, when the control lever 1 is operated backward in the reverse direction from the last step as described above or from each step before reaching said last step, the operation is sequentially reversed to the previous step through each of said steps as the contact holder 165 is subjected to movement in the return direction in a similar manner to that described earlier. Particularly, in the foregoing second embodiment, the arrangement of parts is such that further returning to a previous step from the state where the lever 1 has been returned by one step from the last step, may be effected only by the repetition of the backward operation of the control lever 1. In other words, the projection 171 is provided on the circuit holder 165 in addition to the projections 166 to 170, because the operating element to be controlled is the windshield wipers, which do not involve any critical danger, instead of the lighting system described previously.

On the contrary, if the control lever 1 is axially pushed in, while the above operating condition is maintained, the contact holder 165 is held at a poistion where it is moved rightward in FIG. 21, with the contact plate 180 causing the contact 178 to contact the contact plate 190, and also causing the contact 179 to contact the contact plate 189, whereby the front windshield washer pump motor is connected to the front washer circuit of the battery for driving said washer pump motor and front washers.

It should be noted here that the operations for producing the passing signals in the first embodiment and driving the front washers in the second embodiment may be futher modified to be effected separately, and therefore, taking into account the fact that it is not necessary that the control lever be withdrawn in the axial direction in the second embodiment, the push-in operation in such axial direction is not necessarily required. It should also be noted that, for example, the control lever 1 may be modified to effect operations different from giving the right and left-turn signals and driving of the rear wipers and washers by operation thereof in the first direction, and also operations other than the light control and driving of the front wipers, while the dimmer control may be arranged to be effected by a separate operation. Furthermore, since the concept of the present invention is not limited in its application to the lever switch arrangement for motor vehicles, but is readily applicable to various switch arangements in general, the objects of control thereby are not limited to light control, dimmer control or driving of windshield wipers. Even in the control as described above, the dimmer control may be omitted from the light control, while the intermittent operation may be omitted from the front wiper driving. In short, the concept of the present invention is applicable to any switch arrangements in which the state of operation is changed over by advancing in at least three steps in each direction of reciprocation.

As is clear from the foregoing description, the switch device according to the pesent invention includes the base plate member having the plate surface on which the stationary contact plates are disposed, the contact holder movable on the plate surface in at least three steps in each direction of reciprocation thereof and having the correponding movable contact plates provided thereon for selectively connecting required ones of the stationary contact plates at the stopping positions thereof in each of the three steps of movement and also having engaging projections facing in respective moving directions of the reciprocation, the holder member reciprocal on the contact holder in the same directions as the contact holder and having an engaging member for each direction of the reciprocation provided to engage and push, through the reciprocation thereof, the corresponding one of the engaging projections facing in each direction of the reciprocation for shifting the contact holder to the position of the subsequent step, the projecting wall for each direction of the reciprocation provided at the side of the holder member where the engaging member is located and in a position adjacent the engaging projections so as to remain stationary during movement of the holder member for causing the particular engaging member of the engaging members for the direction of the reciprocation which is directed in the direction opposite to the direction of movement, to elastically ride over the engaging projection, and biasing means for imparting to the holder member an automatic returning force toward the original position after the movement of the holder member.

Accordingly, in each operation causing movement accompanied by automatic returning of the holder member, change-over of the contacts in a stepwise fashion, in which only the contact holder advancing or returning step by step is held at the advanced or return position, is positively effected, and the complicated operations as described above can be smoothly accomplished without giving rise to such inconveniences that the contact holder which is desired to be held at the advanced position is undesirably returned or return of the holder member is obstructed so that the switch device is very suitable for practical use.

A lever switch arrangement having the switch device as described above incorporated therein comprises the control lever operable in the first direction of rotation such as upward, downward and the like from the original position, and also operable in a second direction of rotation such as forward, backward and the like from the neutral position, and further arranged to be automatically returned to the neutral position after movement in the second direction of rotation after having been released after the operation thereof, the first switch provided so as to be actuated by the operation of the control lever in the first direction of rotation, and the second switch provided so as to be actuated by the operation of the control lever in the second direction of rotation, and also to operate stepwise at least in three steps in each direction of reciprocation and allowing the control lever to be returned to the neutral position while maintaining the operational state of the second switch upon releasing of the control lever after its operation.

Accordingly, with respect to the operation at least in the three steps, the control lever after it is released, is always located at the pedetermined neutral position in the second direction of rotation. Therefore, the operation of the control lever in said first direction may be effected from the predetermined neutral position with respect to said second direction of rotation, without any inconvenience in the operation in the first direction, and thus, the driver is not required to take his hand off the steering wheel or the like, which increases the safety of driving to a large extent.

Although the present invention has been fully described by way of example with reference to the accompanying drawings, it is to be noted that various changes and modifications will be apparent to those skilled in the art. Therefore, unless otherwise such changes and modifications depart from the scope of the present invention they should be construed as being included therein.

What is claimed is:

1. An electrical switch, comprising:
    a holder member reciprocatingly movable from a neutral position to operating positions on opposite sides of said neutral position;
    an operating means engaged with said holder member for moving said holder member back and forth to said operating positions;
    means associated with said operating means for normally holding said holder member at the neutral position and for automatically returning said holder member from the respective operating positions on the opposite sides of said neutral position to said neutral position when an operating force on said operating means is released;
    a pair of spring pieces held on said holder member, said spring pieces extending out of the plane of movement of said holder member and being resiliently bendable toward and away from said holder member and oriented in opposite directions to each other, one being inclined toward one operating position and the other inclined toward the other operating position;
    a base plate having a plate surface on which a plurality of stationary contacts are positioned;
    a movable contact holder movable at least three steps in the same direction as one direction of movement of the holder member, said movable contact holder having contacts thereon for electrically connecting predetermined stationary contacts in different circuits at positions corresponding to each step;
    a plurality of engaging projections on said contact holder, there being at least a subplurality of contacts equal to the number of steps on a line corresponding to the line along which one of said spring pieces moves and at least one on a line corresponding to the line along which the other of said spring pieces moves, said projections having engaging faces thereon engageable by said spring pieces for moving said contact holder during movement of said holder member;
    means on said contact holder and said base plate cooperating for stopping and temporarily holding said contact holder at positions corresponding to each of said steps;
    said projections having inclined surfaces on the sides thereof facing in the opposite direction to the engaging faces thereon for causing the spring pieces to ride over said projections during return movement of said holder member from an operating position to said neutral position; and
    a fixed wall means between said holder and said holder member and having portions thereon for engaging the respective spring pieces during movement of said holder member for causing the spring pieces to be raised to pass over projections which are not desired to be engaged during movement of said holder.

2. A switch as claimed in claim 1, particularly for use in a motor vehicle, in which said operating means comprises an operating member engaged with said holder member and a control lever member pivotable in a first direction of pivoting from an original position and also pivotable back and forth in a second direction of pivoting from a neutral position, said control lever member being connected to said operating member for moving said holder member when said control lever member is moved in said second direction, said control lever member being automatically returned to the neutral position with respect to said second direction of pivoting after being released after operation thereof by said means for normally holding said operating means at the neutral position, and a further switch means to which said control lever member is connected for being actuated by the operation of said control lever member in said first direction of pivoting.

3. A switch as claimed in claim 2 in which said further switch means is a switch means for operating turn signals for a vehicle.

4. A switch as claimed in claim 2 in which said further switch means is for operating rear windshield wiper means and rear windshield washer means for a vehicle.

5. A switch as claimed in claim 2 in which said electrical contacts on said stationary plate are contacts for front windshield wiper means and front windshield washer means for a vehicle.

6. A switch as claimed in claim 2 in which said control lever member is further mounted for movement in the direction of the longitudinal axis of said lever, and still further switch means engagable by said control lever member when it is moved in the axial direction for actuating passing signal means for a vehicle.

7. A switch as claimed in claim 1 in which said operating means is further movable toward and away from said holder member, and said holder member has a further spring piece engaged by said holder member and normally substantially in the plane of said holder member and moved out of the plane of said holder member when said operating means is moved toward said holder member, and said movable contact holder has two projections along a line corresponding to the line along which said other of said spring piece moves and spaced from each other, whereby during said movement of said operating member and holder member toward said other operating position, said other of said spring pieces has no projection to engage with for moving said contact holder, and said contact holder has a further projection thereon positioned to be engaged by said further spring piece when said other spring piece has no projection to engage with, whereby said contact holder can be moved toward said other operating position by moving said operating means only toward the other operating position for some of the steps of movement and by moving said operating means toward said holder member as well as toward the other operating position for at least one step of such movement.

8. A switch as claimed in claim 7, particularly for use in a motor vehicle, in which said operating means comprises an operating member engaged with said holder member and a control lever member pivotable in a first direction of pivoting from an original position and also pivotable back and forth in a second direction of pivoting from a neutral position and movable in the direction of the longitudinal axis thereof, said control lever member being connected to said operating member for moving said holder member back and forth when said control lever member is moved in said second direction and for moving said operating member toward said holder member when said control lever member is moved in one direction in the direction of the longitudinal axis thereof, said control lever being automatically returned to the neutral position with respect to said second direction of pivoting after being released after operation thereof by said means for normally holding said operation means at the neutral position.

9. An electrical switch, comprising:
   a holder member reciprocatingly movable from a neutral position to operating positions on opposite sides of said neutral position;
   an operating means engaged with said holder member for moving said holder member back and forth to said operating positions;
   means associated with said operating means for normally holding said holder member at the neutral position and for automatically returning said holder member from the respective operating positions on the opposite sides of said neutral position to said neutral position when an operating force on said operating means is released;
   a base plate having a plate surface on which a plurality of stationary contacts are positioned;
   a movable contact holder movable at least three steps in the same direction as one direction of movement of the holder member, said movable contact holder having contacts thereon for electrically connecting predetermined stationary contacts in different circuits at positions corresponding to each step;
   means on said contact holder and said base plate cooperating for stopping and temporarily holding said contact holder at positions corresponding to each of said steps;
   means on said holder member and said contact holder cooperable for moving said contact holder in one direction of movement or the other and one step at a time and for permitting said holder member to return to said neutral position while said contact holder is held in the position to which it has been moved.

10. A switch as claimed in claim 9 in which said operating means is further movable toward and away from said holder member, and said holder member has further means thereon engagable with said contact holder only when said operating means is moved toward said holder member, said cooperable means being cooperable for moving said contact holder through less than all of the steps of movement thereof and said further means engages said contact member for moving said contact member through at least one step through which said contact holder cannot be moved by said cooperable means.

* * * * *